United States Patent [19]

Zapata

[11] Patent Number: 4,898,598
[45] Date of Patent: Feb. 6, 1990

[54] COMPOUND AND METHOD FOR POLISHING STONE

[75] Inventor: Manuel Zapata, Dallas, Tex.

[73] Assignee: Superior Granite & Marble Restoration, Dallas, Tex.

[21] Appl. No.: 263,350

[22] Filed: Oct. 27, 1988

[51] Int. Cl.$^4$ ............................................. B24D 3/02
[52] U.S. Cl. ...................................... 51/309; 51/298; 51/303; 106/3; 106/6
[58] Field of Search .......................... 51/298, 309, 303; 106/3, 6

[56] References Cited

U.S. PATENT DOCUMENTS 3,615,305 10/1971 Muhler ..................................... 106/3
3,745,029 7/1973 Murphy ................................... 106/3
4,354,871 10/1982 Sutton ..................................... 106/3
4,645,561 2/1987 Rea ......................................... 51/309
4,696,697 9/1987 Kitano et al. .......................... 51/309

FOREIGN PATENT DOCUMENTS 59-182870 10/1984 Japan .

Primary Examiner—Paul Lieberman
Assistant Examiner—Willie J. Thompson
Attorney, Agent, or Firm—Michael A. O'Neil

[57] ABSTRACT

The present invention relates to a compound and method for polishing stone wherein the compound is a mixture of metallic oxides, a resin and a pre-prepared gel which compound is utilized in conjunction with sandpaper of varying grits to provide a smooth high-gloss finish to the cut, rough-edged stone or marble.

9 Claims, No Drawings

COMPOUND AND METHOD FOR POLISHING STONE

TECHNICAL FIELD

This invention relates in general to a compound and method for polishing stone, and in particular to a compound and method for polishing marble.

BACKGROUND OF THE INVENTION

Since the dawn of time, man has been fascinated by the natural geological beauty contained in stones such as marble, and indeed, the use of stone in construction dates at least as far back as the beginning of recorded time when stone was used in the construction of temples and residences by the ancient Egyptians, Greeks and Romans.

Stone, and marble in particular, both natural and artificial, is still a common component in many construction projects ranging from the foyers and floors of large downtown office buildings to the bathroom vanities of many residential dwellings. Such stone or marble is subject to cutting and sawing mechanisms in order to sculpt the stone or marble into the desired configuration. The cut surface of the stone or marble has an extremely rough and uneven appearance and must be smoothed to a significant extent in order to present the aesthetically pleasing and glossy-like finish desired by the property owner.

Although various compounds and methods have been utilized in the past to polish marble or stone, the most prevalent contemporary method involves the use of oxalic acid in a powdered form, which is subsequently dissolved in water and applied onto the surface of the stone or marble to be polished. One inherent problem with utilizing oxalic acid as a polishing compound, however, is that it is a strong irritant and toxic by inhalation and ingestion. In addition, the oxalic acid must be utilized quickly or it will dissolve the stone or marble being polished. Thus, there has been a long-felt need in the industry to provide a polishing compound for stone or marble which is safer and easier to utilize than oxalic acid, but just as effective.

The present invention provides a compound and method of polishing stone and marble that is effective and easy but does not have the inherent problems associated with the prior art.

SUMMARY OF THE INVENTION

The present invention provides a compound and method for polishing stone and marble that is easy to use, effective, and more efficient than that of the prior art. The compound in general comprises a mixture of at least two metallic oxides, a resin and a pre-prepared gel. An additional embodiment of the invention comprises the addition of an oxalate to the above compound. The present invention also provides a method of polishing stone or marble in which a series of sandpapers, ranging from a more coarse to a more fine grit, are utilized to sand the stone until the appropriate smooth finish is reached, followed by polishing the stone with the polishing compound until the desired glossy finish is achieved.

The use of the polishing compound and method of the present invention provides numerous advantages over the prior art while eliminating the deficiencies thereof.

DESCRIPTION OF THE INVENTION

The present invention comprises a compound for polishing stone or marble, which in general comprises a mixture of metallic oxides, a resin and a pre-prepared gel. Additionally, an oxalate may be utilized with the above compound.

In the preferred embodiment of the invention, there are at least two metallic oxides in the polishing compound. Normally, these are stannous oxide (SnO) and aluminum oxide ($AL_2O_3$). Stannous oxide, commonly referred to as tin oxide, may be purchased from any commercial chemical company, including, for example, Dow Chemical Corporation, and is derived by heating stannous hydroxide in a current of carbon dioxide ($CO_2$).

A second metallic oxide utilized is aluminum oxide ($AL_2O_3$), commonly known as alumina, which may also be purchased from any commercial chemical corporation. Aluminum oxide is normally derived by the leaching of bauxite with caustic soda, followed by precipitation of a hydrated aluminum oxide by hydrolysis and seeding of the solution. The alumina hydrate is then washed, filtered, and calcined to remove water and thus, obtain the anhydrous aluminum oxide. Both the aluminum oxide and stannous oxide of the present invention are bought commercially in a powdered form.

A third ingredient of the mixture forming the polishing compound of the present invention is a resin commonly known as dammar wax or gum. Dammar wax may be purchased from any commercial chemical company, such as the O.G. Innes Corporation, and in its natural state is a tree-derived resin, soluble in hydrocarbons and chlorinated solvents and partially soluble in alcohol. In the preferred embodiment of the invention, the dammar wax utilized is a dewaxed 101 Dewaxed Damar, TA-44 Dewaxed Damar Solution and Prime Damar from the O.G. Innes Corporation of New York, N.Y. Like most natural resins, dammar wax is a vegetable-derived, amorphous mixture of carboxylic acids, essential oils and terpenes occurring as exudations on the bark of the trees or shrubs. Such resins are hard and glossy with a conchoidal fracture when cold and soft and sticky below the glass transition point. Although dammar wax is the preferred resin in the polishing compound of the present invention, it is possible to substitute a synthetic high-polymer resin having like characteristics.

A further ingredient of the polishing compound of the present invention is a pre-prepared gel that is mixed with the metallic oxides and resin. The pre-prepared gel in the preferred embodiment of the invention consists of a mixture of methylcellulose propylene glycol and water.

Methylcellulose, also known as cellulose methyl ether or Methocel, is a grayish-white, fibrous powder that swells in water to a viscous, collodial solution having a molecular weight varying from 40,000 to 180,000. Methylcellulose is normally prepared by substituting methoxy group radicals ($CH_3O$) for a hydroxyl group (OH) along the carbon chain. Methocel may be purchased from any commercial chemical company.

The other main ingredient in the gel mixture is propylene glycol ($CH_3CH_0HCH_2OH$) also known as 1,2-dihydroxy propane methylene glycol, methyl glycol, and 1,2-propane diol.

In the preferred embodiment of the invention, the propylene glycol utilized is 1,2-propylene glycol. 1,2- propylene glycol is a colorless, viscous, stable hygroscopic liquid that is soluble in water, alcohols and many organic solvents. Propylene glycol is normally derived by hydration of propylene oxide. Propylene glycol is also commercially available from any commercial chemical company, such as Dow Chemical Corporation.

The gel mixture is prepared by mixing propylene glycol, methylcellulose and water in predetermined amounts to form an amorphous gel used in preparing the polishing compound of the present invention. In the preferred embodiment of the invention, the gel is prepared by mixing approximately one (1) quart of propylene glycol, six point seven (6.7) ounces of methylcellulose and four and one-half (4½) gallons of water One other ingredient that may be added to the polishing compound in a second embodiment of the invention is an oxalate which in general is a salt of oxalic acid. Although other oxalates may be utilized in preparing the polishing compound of the present invention, in the preferred second embodiment sodium oxalate is utilized. Sodium oxalate ($NA_2C_2O_4$) is a white crystalline powder soluble in water. Sodium oxalate may also be purchased from any commercial chemical company and is formed, as are most salts, by replacing the hydrogen of oxalic acid with sodium.

EXAMPLE NO. 1

Although the various ingredients of the polishing compound may be mixed in any order to form the finished compound, in one embodiment of the invention the gel is pre-prepared as discussed hereinabove. After the gel is prepared, the stannous oxide, aluminum oxide and dammar wax are mixed together in any order but in the following proportions: 1 part stannous oxide, 3 parts aluminum oxide, and 1 part dammar wax. The resulting mixture is then added to 1.5 parts of the pre-prepared gel. The above proportions are measured by volume.

EXAMPLE NO. 2

In a second embodiment of the invention, the stannous oxide, aluminum oxide and dammar wax are first mixed and subsequently the gel is formed as described hereinabove. Afterwards, the gel mixture is added to the previously-mixed ingredients in the same proportions as above to form the polishing compound of the present invention.

EXAMPLE NO. 3

Although the various ingredients of the polishing compound may be mixed in any order to form the finished compound, in one embodiment of the invention the gel is pre-prepared as discussed hereinabove. After the gel is prepared, the stannous oxide, aluminum oxide, sodium oxalate and dammar wax are mixed together in any order but in the following proportions: 1 part stannous oxide, 3 Parts aluminum oxide, 1 part dammar wax and 1 part sodium oxalate. The resulting mixture is then added to 1.5 parts of the pre-prepared gel. The above proportions are measured by volume.

After the polishing compound is manufactured, it is packaged in a container of suitable size for shipment and use.

The present invention also includes a method of polishing stone that involves the steps of sanding and polishing the rough edges of the cut stone or marble. In general, the method includes sanding the stone with sandpaper of the desired and necessary grit until the desired smooth finish is reached. Afterwards, the polishing compound of the present invention is utilized to polish the stone or marble until the desired degree of finished gloss is reached. The stone or marble may be sanded either by hand or through the use of a sanding machine, commercially available from most hardware establishments. The abrasive belts are made of wet/dry silicone carbide paper. The belts, however, are not "standard," and therefore, must be special ordered through a manufacturer and "2½by 16" inches in dimension.

In the preferred embodiment, the stone or marble is sanded in the following order—60-grit sandpaper, 120-grit sandpaper 220-grit sandpaper, and 400-grit sandpaper until the desired finish is reached. The lower the grit number, the more coarse the sandpaper. For example, a 60-grit sandpaper is more coarse than a 120-grit, which is more coarse than a 220-grit, etc.

After the stone edges have been sanded, utilizing the 60 through 400-grit sandpaper, the polishing compound of the present invention is then placed onto a polishing pad, which is then utilized to polish the sanded edges of the stone until the desired finishing gloss has been reached.

The stone may be sanded by hand or through the use of a sanding machine. If the stone is sanded by hand, in one embodiment of Applicant's invention, a wooden holder is inserted into the sandpaper.

A further embodiment of the method of polishing stone or marble utilizes a pre-prepared polishing kit that has a set amount of polishing compound, a wooden sandpaper holder, and includes 60-grit, 120-grit, 220-grit, and 400-grit sandpaper. Additionally, the kit contains a felt pad upon which the polishing compound is placed. In utilizing the polishing kit for polishing the edges of the stone or marble by hand, the following steps are undertaken in consecutive order:

1. Placing a wooden holder into 60-grit sandpaper;
2. Sanding the rough edges of the cut stone or marble with the 60-grit sandpaper;
3. Repeating steps 1 and 2 with 120-grit sandpaper;
4. Repeating steps 1 and 2 with 220-grit sandpaper;
5. Repeating steps 1 and 2 with 400-grit sandpaper until the desired smooth finish has been reached;
6. Applying a suitable amount of polishing compound upon a felt pad; and
7. Polishing the stone with the polishing compound until the desired degree of finish gloss has been reached.

Although the invention has been described in detail, it is to be clearly understood that the same is by way of illustration and example only and is not to be taken by way of limitation, the spirit and scope of the invention being limited only to the terms of the appended claims.

I claim:

1. A compound for polishing stone comprising a mixture of aluminum and stannous metallic oxides, a natural resin wax and a pre-prepared gel.

2. A compound for polishing stone in accordance with claim 4 wherein the natural resin is dammar wax.

3. A compound for polishing stone in accordance with claim 1 wherein the pre-prepared gel is a mixture of methylcellulose, propylene glycol and water.

4. A compound for polishing stone in accordance with claim wherein the propylene glycol is 1,2-propylene glycol.

5. A compound for polishing stone in accordance with claim 3 wherein the pre-prepared gel comprises a mixture of one (1) quart of propylene glycol, six point seven (6.7) ounces of methylcellulose, and four and one-half (4½) gallons of water.

6. A compound for polishing stone in accordance with claim 1, wherein the mixture further comprises one (1) part stannous oxide, three (3) parts aluminum oxide, one (1) part dammar resin and one point five (1.5) parts pre-prepared gel.

7. A compound for polishing stone comprising a mixture of alumioum and stannous metallic oxides, a natural resin wax, a pre-prepared gel and an oxalate.

8. A compound for polishing stone in accordance with claim 7, wherein the oxalate is sodium oxalate.

9. A compound for polishing stone in accordance with claim 7 wherein the mixture further comprises one (1) part stannous oxide, three (3) parts aluminum oxide, one (1) part dammar resin, one point five (1.5) parts pre-prepared gel, and one (1) part sodium oxalate.

* * * * *

UNITED STATES PATENT AND TRADEMARK OFFICE
CERTIFICATE OF CORRECTION

PATENT NO. : 4,898,598

DATED : Feb. 6, 1990

INVENTOR(S) : Manuel Zapata

It is certified that error appears in the above-identified patent and that said Letters Patent is hereby corrected as shown below:

Column 4, line 60, "claim 4" should be --claim 1--.

Column 4, line 65, "claim wherein" should be --claim 3 wherein--.

Column 6, line 2, "alumioum" should be --aluminum--.

Signed and Sealed this

Twelfth Day of March, 1991

Attest:

HARRY F. MANBECK, JR.

*Attesting Officer*

*Commissioner of Patents and Trademarks*